United States Patent
Hashimoto

(10) Patent No.: US 9,286,661 B2
(45) Date of Patent: Mar. 15, 2016

(54) METHOD, APPARATUS, AND COMPUTER PROGRAM PRODUCT FOR PROCESSING AN IMAGE TO REDUCE IMAGE DETERIORATION

(71) Applicant: Ayumu Hashimoto, Kanagawa (JP)

(72) Inventor: Ayumu Hashimoto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/311,919

(22) Filed: Jun. 23, 2014

(65) Prior Publication Data

US 2014/0376808 A1    Dec. 25, 2014

(30) Foreign Application Priority Data

Jun. 24, 2013   (JP) ................................. 2013-131674

(51) Int. Cl.
| | | |
|---|---|---|
| *G06K 9/00* | (2006.01) | |
| *G03F 3/08* | (2006.01) | |
| *G06T 5/00* | (2006.01) | |
| *G06K 9/46* | (2006.01) | |
| *G06K 9/38* | (2006.01) | |

(52) U.S. Cl.
CPC . *G06T 5/002* (2013.01); *G06K 9/38* (2013.01); *G06K 9/4652* (2013.01); *G06T 2207/10024* (2013.01); *G06T 2207/20012* (2013.01); *G06T 2207/20192* (2013.01)

(58) Field of Classification Search
USPC .................................. 382/167, 163; 358/518
See application file for complete search history.

(56) References Cited

U.S. PATENT DOCUMENTS

| | | | |
|---|---|---|---|
| 5,293,207 A * | 3/1994 | Haneda .......................... | 358/500 |
| 5,392,365 A * | 2/1995 | Steinkirchner ............... | 382/260 |
| 6,178,010 B1 | 1/2001 | Takenouchi et al. | |
| 6,226,397 B1 * | 5/2001 | Yamagata et al. ............ | 382/162 |
| 6,600,832 B1 * | 7/2003 | Nakayama et al. ........... | 382/162 |
| 7,751,082 B2 * | 7/2010 | Otake et al. .................... | 358/1.9 |
| 8,477,324 B2 * | 7/2013 | Miyagi ........................ | 358/1.13 |
| 2002/0136463 A1 * | 9/2002 | Akahori et al. ............... | 382/260 |
| 2003/0035673 A1 * | 2/2003 | Yamakawa ..................... | 400/76 |
| 2003/0058465 A1 * | 3/2003 | Miyagi et al. .................. | 358/1.9 |
| 2004/0061882 A1 | 4/2004 | Yamakawa | |
| 2004/0174546 A1 | 9/2004 | Guleryuz | |
| 2004/0175037 A1 | 9/2004 | Guleryuz | |

(Continued)

FOREIGN PATENT DOCUMENTS

| | | |
|---|---|---|
| JP | 07-264409 | 10/1995 |
| JP | 10-173916 | 6/1998 |

(Continued)

*Primary Examiner* — Kathleen Y Dulaney
(74) *Attorney, Agent, or Firm* — Oblon, McClelland, Maier & Neustadt, L.L.P.

(57) ABSTRACT

A method for processing an image includes: detecting and outputting an attributed of each pixel of input image data; performing a filtering process in which smoothing is performed on the input image data; detecting an edge amount being N value (where N>2) information from the data subjected to the smoothing; removing a chromatic color in a first removal amount according to the detected edge amount from all of the pixels; and removing a chromatic color in a second removal amount according to the detected edge amount from the pixel that has been determined to have a text attribute and an achromatic attribute at the detecting, wherein the second removal amount is determined on the basis of a discrete M value (where M>2) corresponding to the edge amount.

8 Claims, 4 Drawing Sheets

(56) References Cited

U.S. PATENT DOCUMENTS

| | | | |
|---|---|---|---|
| 2005/0088673 A1* | 4/2005 | Yokochi | 358/1.9 |
| 2008/0144975 A1* | 6/2008 | Shibaki et al. | 382/299 |
| 2008/0310730 A1* | 12/2008 | Hayasaki | 382/195 |
| 2010/0259771 A1* | 10/2010 | Sakamoto | 358/1.2 |
| 2010/0259775 A1* | 10/2010 | Sakamoto | 358/1.9 |
| 2011/0052078 A1* | 3/2011 | Yamakawa | 382/199 |

FOREIGN PATENT DOCUMENTS

| | | |
|---|---|---|
| JP | 2003-046772 | 2/2003 |
| JP | 2003-101773 | 4/2003 |
| JP | 2004-272902 | 9/2004 |

* cited by examiner

FIG.3A

UNDER-COLOR REMOVAL
PROCESS IN FIRST STAGE
(FINAL OUTPUT IS C'M'Y')

· IDENTICAL PROCESS IS
PERFORMED ON ENTIRE
PORTION REGARDLESS OF
SEPARATION RESULT

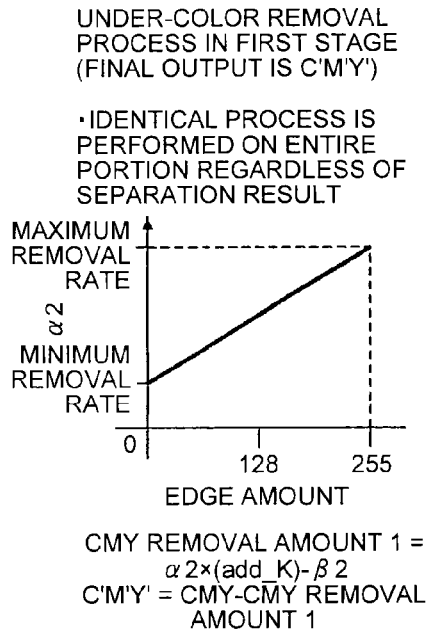

CMY REMOVAL AMOUNT 1 =
$\alpha 2 \times (add\_K) - \beta 2$
C'M'Y' = CMY-CMY REMOVAL
AMOUNT 1

FIG.3B

UNDER-COLOR REMOVAL PROCESS IN
SECOND STAGE
(FINAL OUTPUT IS C"M"Y")

· SEPARATION RESULT IS USED
(i) WHEN SEPARATION RESULT IS TEXT-ACHROMATIC

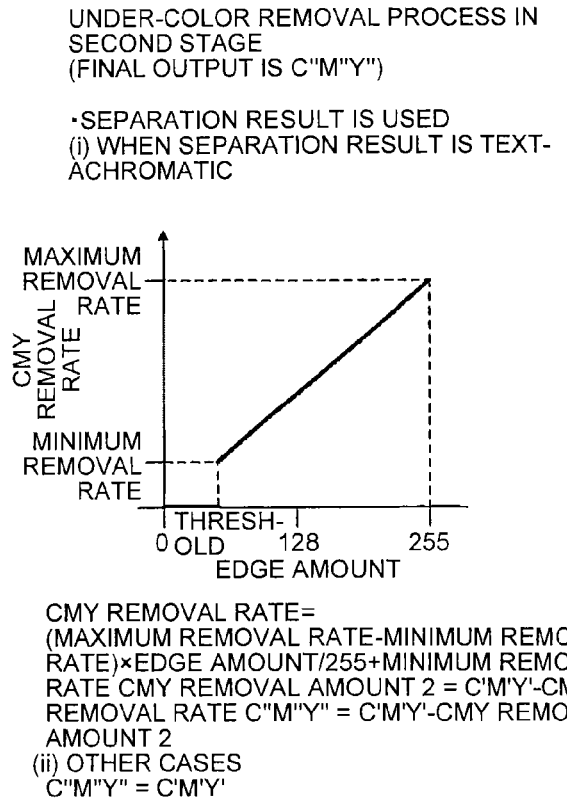

CMY REMOVAL RATE=
(MAXIMUM REMOVAL RATE-MINIMUM REMOVAL
RATE)×EDGE AMOUNT/255+MINIMUM REMOVAL
RATE CMY REMOVAL AMOUNT 2 = C'M'Y'-CMY
REMOVAL RATE C"M"Y" = C'M'Y'-CMY REMOVAL
AMOUNT 2
(ii) OTHER CASES
C"M"Y" = C'M'Y'

FIG.4A

UNDER-COLOR REMOVAL
PROCESS IN FIRST STAGE
(FINAL OUTPUT IS C'M'Y')

· IDENTICAL PROCESS IS
PERFORMED ON ENTIRE
PORTION REGARDLESS OF
SEPARATION RESULT

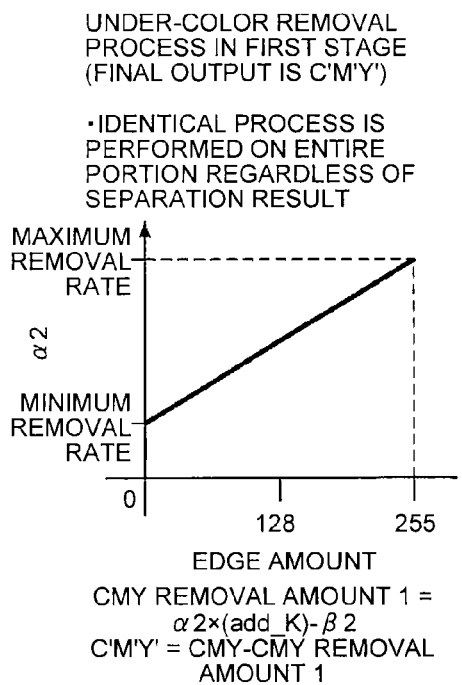

CMY REMOVAL AMOUNT 1 =
$\alpha 2 \times (add\_K) - \beta 2$
C'M'Y' = CMY-CMY REMOVAL
AMOUNT 1

FIG.4B

UNDER-COLOR REMOVAL PROCESS IN
SECOND STAGE
(FINAL OUTPUT IS C"M"Y")

· SEPARATION RESULT IS USED
(i) WHEN SEPARATION RESULT IS TEXT-ACHROMATIC
WHEN CMY REMOVAL RATE IS 2 BITS

| EDGE AMOUNT | CMY REMOVAL RATE |
|---|---|
| 0 TO 63 | 0 |
| 64 TO 127 | 0.5 |
| 128 TO 191 | 0.75 |
| 192 TO 255 | 1 |

C"M"Y"= C'M'Y'-C'M'Y'×CMY REMOVAL RATE
(ii) OTHER CASES
C"M"Y" = C'M'Y'

FIG.5

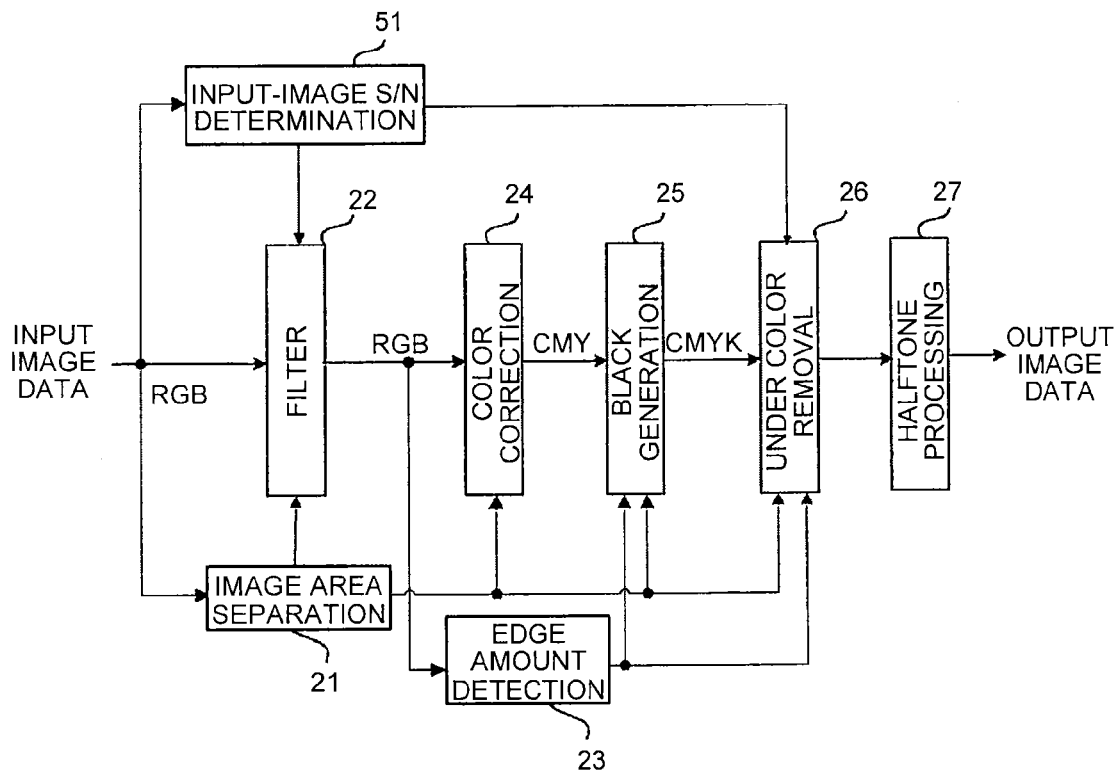

FIG.6

| No | S/N RATIO OF INPUT IMAGE | USE OF SEPARATION RESULT | |
|---|---|---|---|
| | | EMPHASIS FILTER | SMOOTHING FILTER |
| 1 | (S/N) ≥ A | SEPARATION RESULT IS USED | SEPARATION RESULT IS USED |
| 2 | B<(S/N)<A | SEPARATION RESULT IS NOT USED | SEPARATION RESULT IS USED |
| 3 | (S/N) ≤ B | SEPARATION RESULT IS NOT USED | SEPARATION RESULT IS NOT USED |

*A (dB) is S/N OF INPUT IMAGE SUFFICIENTLY HIGH FOR IMAGE AREA SEPARATION TO FUNCTION
B (dB) is S/N OF INPUT IMAGE THAT CANNOT GUARANTEE FUNCTION OF IMAGE AREA SEPARATION

FIG.7

(b) UNDER-COLOR REMOVAL PROCESS IN SECOND STAGE
WHEN SEPARATION RESULT IS TEXT-ACHROMATIC

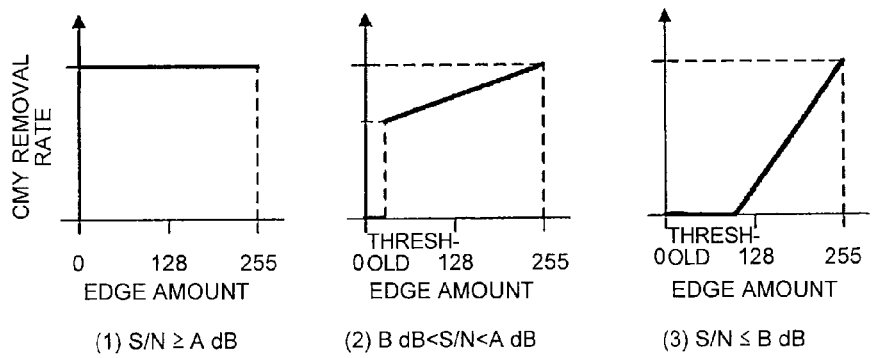

(1) S/N ≥ A dB          (2) B dB<S/N<A dB          (3) S/N ≤ B dB

*A (dB) is S/N OF INPUT IMAGE SUFFICIENTLY HIGH FOR IMAGE AREA SEPARATION TO FUNCTION
B (dB) is S/N OF INPUT IMAGE THAT CANNOT GUARANTEE FUNCTION OF IMAGE AREA SEPARATION

FIG.8

(b) UNDER-COLOR REMOVAL PROCESS IN SECOND STAGE
WHEN SEPARATION RESULT IS TEXT-ACHROMATIC (1) S/N ≥ A dB

| EDGE AMOUNT | CMY REMOVAL RATE |
|---|---|
| 0 TO 15 | 0 |
| 16 TO 255 | 1 |

(2) B dB<S/N<A dB

| EDGE AMOUNT | CMY REMOVAL RATE |
|---|---|
| 0 TO 31 | 0 |
| 32 TO 63 | 0.25 |
| 64 TO 95 | 0.38 |
| 96 TO 127 | 0.50 |
| 128 TO 159 | 0.63 |
| 160 TO 191 | 0.75 |
| 192 TO 223 | 0.88 |
| 224 TO 255 | 1 |

(3) S/N ≤ B dB

| EDGE AMOUNT | CMY REMOVAL RATE |
|---|---|
| 0 TO 15 | 0 |
| 16 TO 31 | 0.13 |
| 32 TO 47 | 0.19 |
| 48 TO 63 | 0.25 |
| 64 TO 79 | 0.31 |
| 80 TO 95 | 0.38 |
| 96 TO 111 | 0.44 |
| 112 TO 127 | 0.50 |
| 128 TO 143 | 0.56 |
| 144 TO 159 | 0.63 |
| 160 TO 175 | 0.69 |
| 176 TO 191 | 0.75 |
| 192 TO 207 | 0.81 |
| 208 TO 223 | 0.88 |
| 224 TO 239 | 0.94 |
| 240 TO 255 | 1 |

*A (dB) is S/N OF INPUT IMAGE SUFFICIENTLY HIGH FOR IMAGE AREA SEPARATION FUNCTIONS
B (dB) is S/N OF INPUT IMAGE THAT CANNOT GUARANTEE FUNCTION OF IMAGE AREA SEPARATION

METHOD, APPARATUS, AND COMPUTER PROGRAM PRODUCT FOR PROCESSING AN IMAGE TO REDUCE IMAGE DETERIORATION

CROSS-REFERENCE TO RELATED APPLICATIONS

The present application claims priority to and incorporates by reference the entire contents of Japanese Patent Application No. 2013-131674 filed in Japan on Jun. 24, 2013.

BACKGROUND OF THE INVENTION

1. Field of the Invention

The present invention relates to a method, an apparatus, and a computer program of processing an image, and more particularly to a technique of reducing image deterioration when erroneous determination occurs in image area separation.

2. Description of the Related Art

For the purpose of improving quality of photocopied images, an image processing method using image area separation has already been known in which process to be performed is switched according to characteristics of an image such as characters, pictures and patterns, or backgrounds (for example, Japanese Laid-open Patent Publication Nos. 2003-101773, 10-173916, 2004-272902, 07-264409, and 2003-046772). However, in the conventional image processing method using the image area separation, for a low light intensity image (low signal-to-noise (S/N) image), erroneous determination in the image area separation have often occurred because of noise from a reading device (a portion of a picture is erroneously determined as a text area). In other words, in a low-light-intensity scanner device aiming for energy saving, there has been a problem that process switching with erroneous determination in the image area separation greatly influences deterioration in image quality.

Moreover, if a method without using the image area separation is adopted, when chromatic aberration occurs while reading characters in black, because it is difficult to determine whether it is the chromatic aberration of black characters just by detecting a local edge amount, the amount of CMY cannot be reduced. As a result, characters are to be black characters with colors, causing such a problem that the characters appear blurry.

In Japanese Laid-open Patent Publication No. 2003-101773, an image processing apparatus aiming for improvement in image quality is disclosed. The apparatus detects an edge region in binary data and an edge amount in multiple-value data for an input image, and detects a third characteristic amount by selectively switching those data. By controlling image correction in a subsequent stage using this result, deterioration in image quality such as "crack" and "coloring" of an edge portion of characters can be handled.

In Japanese Laid-open Patent Publication No. 2003-101773, use of a separation determination result in binary data and an edge amount in multiple-value data in combination for image correction in a subsequent stage is disclosed. However, in this technique, because the edge region and the edge amount are both detected from an input image, deterioration in image quality cannot be handled that occurs when erroneous determination of an edge region is made for an input image with a low S/N as described above. The portion determined as an edge is maximum-valued regardless of a value of the edge amount.

In Japanese Laid-open Patent Publication No. 10-173916 also, an image processing apparatus having means of performing image areas separation is disclosed. In Japanese Laid-open Patent Publication No. 10-173916, an image processing apparatus that has a first text/image-separation determining unit that functions as a first determining unit, a first image correcting unit that performs control based on a result thereof, an edge determining unit that functions as a second determining unit, and a second correcting unit that performs control based on a result thereof is disclosed for the purpose of saving thin multi-sided characters of small point sizes. Furthermore, as for the edge determining unit, a component positioned subsequent to the first image-quality correcting unit is also described.

Although the technique disclosed in Japanese Laid-open Patent Publication No. 10-173916 is a technique thus having the determining units in two stages, it is to save, by the second determining unit, text that cannot be separated by the first determining unit, and it is considered that this is not to solve the problem of deterioration in image quality when a portion in an image is erroneously determined as text by the first determining unit.

In Japanese Laid-open Patent Publication No. 2004-272902, description about image processing in which image-area separation determination is performed, and image quality correction is performed using a result of the determination and a result of an edge amount after smoothing processing in combination is considered to be included. In Japanese Laid-open Patent Publication No. 07-264409, description that image area separation is performed, and image processing of removing a background is performed is considered to be included. In Japanese Laid-open Patent Publication No. 2003-046772, a specific method for image-area separation process is described.

Embodiments disclosed in this specification, to support low light-intensity scanners, image processing so as to suppress deterioration in image quality even when erroneous determination is made in the image area separation is performed. More specifically, an image characteristic amount is extracted after determination in the image area separation and smoothing filtering process are performed, and image-quality correction processing (black generation, under color removal) in a subsequent stage is performed using those results in combination.

When an amount of under color removal is calculated in continuous values to perform correction for removal at the time of under color removal process, some amount of memory for operation required for the process is necessary. However, even if the amount of under color removal is calculated in excessively continuous values, it does not actually have great influence on the image quality.

In view of the above situations, there is a need to perform image processing that enables to suppress deterioration in image quality at low cost even when erroneous determination occurs in image area separation.

SUMMARY OF THE INVENTION

There is a need to at least partially solve the problems in the conventional technology.

According to an aspect of the present invention, there is provided a method for processing an image including: detecting and outputting an attributed of each pixel of input image data; performing a filtering process in which smoothing is performed on the input image data; detecting an edge amount being N value (where N>2) information from the data subjected to the smoothing; removing a chromatic color in a first removal amount according to the detected edge amount from all of the pixels; and removing a chromatic color in a second removal amount according to the detected edge amount from the pixel that has been determined to have a text attribute and an achromatic attribute at the detecting, wherein the second removal amount is determined on the basis of a discrete M value (where M>2) corresponding to the edge amount.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A and 3B are diagrams (comparative examples) for explaining details of under-color removal process shown in FIG. 2;

FIGS. 4A and 4B are diagrams (embodiments) for explaining details of the under-color removal process shown in FIG. 2;

FIG. 5 is a block diagram (part 2) illustrating a configuration of the image-data processing apparatus shown in FIG. 1;

FIG. 6 is a table indicating modes of switching use of separation results according to an S/N of an input image in the configuration shown in FIG. 5;

FIG. 7 is a diagram for specifically explaining a method (comparative example) of controlling the under-color removal process according to the S/N of the input image in the configuration shown in FIG. 5; and FIG. 8 is a diagram for specifically explaining a method (embodiment) of controlling the under-color removal process according to the S/N of the input image in the configuration shown in FIG. 5.

DETAILED DESCRIPTION OF THE PREFERRED EMBODIMENTS

In an embodiment of the present invention explained below, image area separation is performed on an input image, and smoothing filtering process is performed in addition thereto. To image data in which noise has been reduced by this filtering process, detection of edge amount in multi-value data is performed anew, and processing in a subsequent stage is controlled using a result of the image area separation and a result of the edge amount detection in combination. Therefore, reduction of coloring of characters caused by the image area separation and reduction of deterioration in image quality caused by erroneous determination made in the image area separation due to the input image being a low S/N image are enabled. Accordingly, while in the conventional image processing method in existing circumstances, erroneous determination is made in the image area separation for an input image having a low S/N, and deterioration in image quality occurs due to a process switched as a result of the erroneous determination, in the invention disclosed below, image quality of an output image can be preserved.

More specifically, by using a result of determination in the image area separation and a result of the edge amount detection at the time of under color removal, it is possible to suppress coloring of a text portion and deterioration in image quality of a part of a picture caused by erroneous determination in the image area separation. Furthermore, by performing discrete process switching within a scope that deterioration in image quality is not conspicuous to reduce the number of bits used for a CMY removal rate, cost can be reduced. In other words, such image processing that can suppress deterioration in image quality as described above is enabled at low cost.

Although the image processing according to the present embodiment can also be applied to a general-purpose computer, an embodiment of a case of application to a digital image processing apparatus that is also called an MFP is disclosed below as an example.

Figure 1:
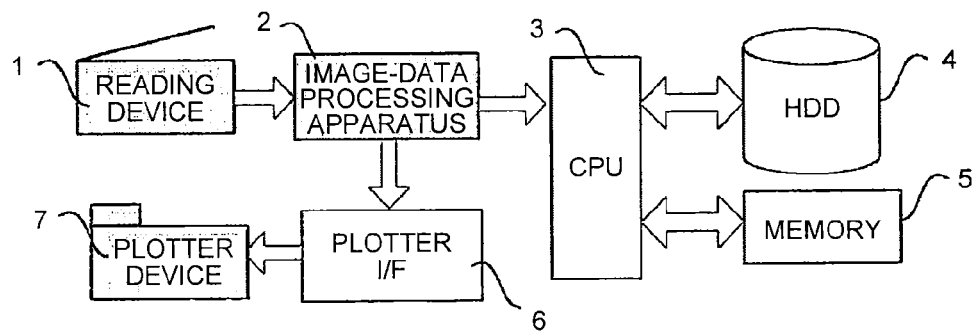
FIG. 1 is a block diagram illustrating an entire configuration of a multifunction peripheral (MFP) according to an embodiment of the present invention.

FIG. 1 illustrates an entire configuration of the digital image processing apparatus (MFP) according to the present embodiment. A reading device 1 generates and outputs 600 dots per inch (dpi) digital image data of RGB of 8 bits each, from density data of an original copy acquired by scanning the original copy. An image-data processing apparatus 2 performs image processing described later on the digital image data from the reading device 1 to output.

A central processing unit (CPU) 3 is a microprocessor that controls the entire digital image processing apparatus. A hard disk drive (HDD) 4 is a storage device to store digital image data and associated data of the digital image data. A memory 5 is a volatile memory that is used to store a program or intermediate data temporarily when the CPU 3 performs control of the digital image processing apparatus.

A plotter interface (I/F) 6 receives CMYK digital image data that is sent from the image-data processing apparatus 2, and outputs the data to an I/F dedicated to a plotter device 7. Upon receiving the CMYK digital image data, the plotter device 7 outputs an image onto a transfer sheet by an electrophotographic process using laser beams and the like.

Figure 2:
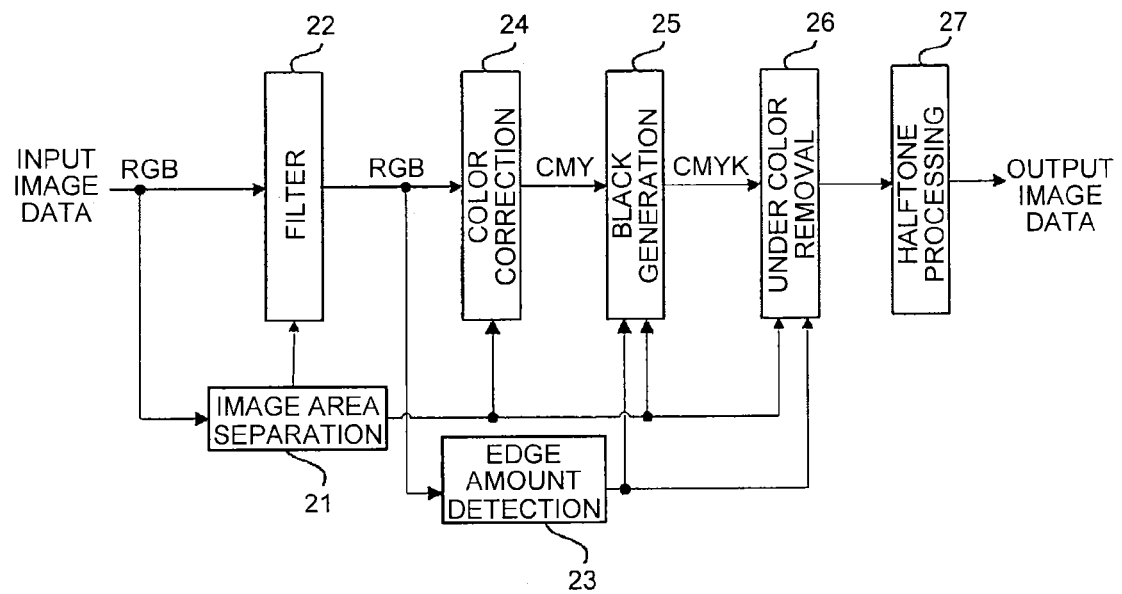
FIG. 2 is a block diagram (part 1) illustrating a configuration of an image-data processing apparatus shown in FIG. 1.

FIG. 2 illustrates the process performed by the image-data processing apparatus 2.

In image area separation 21, determination of attributes such as edge/not edge, text/not text, chromatic/achromatic, halftone dot/not halftone dot, or the like as characteristic of each pixel is performed for RGB input data. Because the specific processing of the image area separation 21 is described in Japanese Laid-open Patent Publication No. 2003-046772, the detailed method is omitted.

A filter 22 performs emphasis or smoothing process on input image data. Although it is possible to switch the process according to an image attribute based on a result of the image area separation 21, in the present configuration, a separation result is input but not used because erroneous determination can occur in the image area separation 21 depending on the S/N of an input image, leading to deterioration in the image quality.

In edge amount detection 23, detection of an edge amount is performed on an RGB image subjected to the filtering process. The method thereof is performed using the method of "FIG. 5 edge amount detection" described in Japanese Laid-open Patent Publication No. 2003-101773. This method is to perform masking process using four kinds of 7×7 filters in vertical, horizontal, and diagonal directions. Among those outputs, one having a largest absolute value is selected and output as the edge amount. Although the bit width is explained as 8 bits in later explanation, it can be smaller bit as long as not causing any defect in the image quality.

In color correction 24, the RGB image subjected to the filtering process is converted into a CMYK image.

In black generation 25, a K-signal for black generation is controlled based on a result of the image area separation and a result of the edge amount detection. The method of the black generation 25 is a known technique, and is controlled by an equation $K=\alpha \times \min(C, M, Y)-\beta$. It is controlled such that for a portion determined as text in a result of the separation determination, $\alpha$ and $\beta$ are fixed parameters, and for a portion determined as not text, $\alpha$ and $\beta$ are varied according to an edge amount.

In under color removal 26, CMY removal is performed using the K-signal output from the black generation as a result of the image area separation and the edge amount detection. The specific processing method is explained later with reference to FIGS. 3A and 3B and later.

In halftone processing 27, to convert data of CMYK of 8 bits each into data in a tone level (for example, CMYK of 2 bits each) of the plotter device, pseudo-halftone processing such as dithering process and error diffusion process is performed.

FIGS. 3A and 3B are diagrams for explaining under color removal process of a comparison example.

Before explaining the under color removal 26, the black generation 25 is explained first. In black generation process in a preceding stage, the K-signal is generated by following procedures. The generated K-signal is referred to as add_K. As the black generation process, following processing is performed.

(1) Portion determined as text-achromatic $$\text{add\_}K=\alpha 0 \times \min(C,M,Y)-\beta 0$$

($\alpha 0$, $\beta 0$ are fixed values)
For example, when $\alpha 0=1$, $\beta 0=0$, the K-signal is generated only for $\min(C, M, Y)$.
(2) Others $$\text{add\_}K=\alpha 1 \times \min(C,M,Y)-\beta 1$$

($\alpha 1$, $\beta 1$ both vary according to an edge amount)

Based on a result of the edge amount detection, the K-signal is controlled. Specifically, the value of the K-signal is controlled according to an edge amount in stages, to be what percent of the smallest value of the CMY signals. In this processing, the black generation is controlled in stages according to an edge amount to achieve both improvement in text quality of a black text portion on halftone dots desired to be expressed in K although it is not determined as text-achromatic (black text), and avoidance of deterioration in granularity of a highlighted portion in a picture caused when a K-signal component is mixed.

Next, in the under color removal process shown in FIGS. 3A and 3B, the following processing in two steps is performed using "K-signal (add_K)" that is generated by the black generation processing, a "separation result", and an "edge-amount calculation result".

First, as a first stage, a CMY removal amount is determined using the K-signal output by the black generation and the edge detection result, regardless of the separation result. Details are shown in FIG. 4A. The identical processing is performed in the entire portion regardless of the separation result. First, a CMY removal rate of a target pixel is determined using the edge amount extracted by the edge amount detection in the preceding stage. According to that and the K-signal (add_K), a CMY removal amount 1 is determined. At the point of completion of the under color removal of the first stage, a C'M'Y'-signal is output.

Next, as a second stage, additional CMY removal is performed by using the separation result. The purpose of this under color removal in the second stage is to avoid deterioration in the image quality of black text and the like caused by color deviation at the time of reading. Although a color deviation portion at reading of black text is determined as "text-achromatic (black text)", if the portion determined as black text is processed simply regarding CMY as zero, CMY is removed also from portions in a picture that have not been properly separated from "text-achromatic" because it is a low S/N image, resulting in great deterioration in the image quality. In addition, for such a color deviation portion, even if the black generation/under color removal are performed, the K-signal is not generated because $\min(C, M, Y)$ is too small in the first place. Therefore, the under color removal in the second stage as shown in FIG. 4B is necessary. By performing control with continuous variation on a result of the image area separation using an edge amount that is detected after the smoothing filtering so that influence of noise is reduced, CMY removal is performed for a portion in which color deviation has occurred at reading, and CMY removal is unlikely to be performed for a portion that has not been properly separated, thereby maintaining the image quality.

A specific processing method is described below.

As shown in FIG. 3B, for a pixel having the separation result of "text-achromatic", this under color removal in the second stage is activated.

For the pixel of "text-achromatic", the CMY removal rate is determined according to a result of the edge amount detection. At this time, a maximum removal rate and a minimum removal rate, and a threshold of the edge amount that validates the removal in the second stage can be given in parameters. A CMY removal amount 2 is calculated from the CMY removal rate thus determined and the value of C'M'Y', and the final CMY output after the under color removal is C"M"Y".

When the separation result is "other than text-achromatic", this under color removal in the second stage is not performed, and it is output as C"M"Y"=C'M'Y'.

In FIGS. 3A and 3B, the method in which the CMY removal rates for a portion determined as achromatic are in continuous variation using the edge amounts has been shown. However, if the bit amount is increased so as to have the CMY removal rate in continuous variation, cost increases therefor. Although it is sure that calculation of the CMY removal as shown in FIGS. 3A and 3B is required when control with precise CMY removal is performed, if the influence to the image quality of the CMY removal in the second stage is not so great, it is preferable to take a method in which about 2 bits or 3 bits are used for the CMY removal rate to be managed in a table, in terms of cost reduction. In FIGS. 4A and 4B, a method of such under color removal is shown.

FIGS. 4A and 4B are diagrams for explaining the under color removal process of the embodiment.

When the CMY removal rate in the second stage is 2 bits, the CMY rates corresponding to certain edge amount ranges are determined in advance, and the CMY rate is referred on the basis of a table thereof.

While the CMY rate is 2 bits when the edge amount is 8 bits in this example shown in FIGS. 4A and 4B, if the number of bits of the CMY rate is increased (the number of tables is increased), it becomes closed to the continuous variation in the removal rate shown in FIGS. 3A and 3B. On the other hand, if the number of bits is decreased, it becomes close to a binary process. By thus managing with tables in small number of bits when the influence to the image quality is not great, cost can be reduced.

According to the above embodiment, the under color removal as described above is performed using a determination result from the image-area separation process, that is, a pixel-attribute determining process, and a result of edge amount detection after filtering. As a result, "coloring of a text portion" can be reduced, and "deterioration in image quality due to erroneous determination of a separation result of a portion in a picture" can be suppressed. The under color removal is performed with multiple values within a scope that deterioration in the image quality of the portion of the picture that has been erroneously determined is insignificant. Because it is rather discrete multiple values not continuous multiple values, the number of bits can be reduced. Therefore, cost can be reduced.

In the above embodiment, it is configured such that a result of the image area separation is not used in the filtering process in consideration that erroneous determination can be made in the image area separation. In FIG. 5, a configuration in which a result of the image area separation is used in filtering is also shown.

In the example shown in FIG. 5, input-image S/N determination 51 is included in addition to the configuration shown in FIG. 2. The input-image S/N determination 51 functions when it is in an S/N measurement mode and a predetermined image for measurement is input. This S/N is determined by characteristics of a light source of a scanner or a device in a present state. The S/N is expected to vary with time degradation of the light source and the like. Because the determination precision in the image area separation is expected to be degraded in such a case compared to the initial state, it can be used as a means of easing deterioration in the image quality. A result of the input-image S/N determination 51 is used for image quality correction when a copy application or a scanner application is executed later, and the process is switched. A specific use method is described later.

The S/N can be measured by a common method, and variation of a reading values at some points of an original print having certain density are to be measured. In FIG. 6, a switching mode of use of a separation result according to the S/N of an input image is shown.

In the configuration shown in FIG. 2, because the separation precision is not reliable depending on the S/N of an input image, to avoid deterioration in the image quality caused by filtering process switching, a separation result is not used. When an attribute of each image area is determined accurately, by switching the filtering process to the filtering process using a separation result, the image quality can be greatly improved. For example, in a portion that is determined as text or an edge, by increasing emphasis and suppressing smoothing, a sharp image can be achieved. On the other hand, in a portion determined as a halftone dot or a picture, by decreasing emphasis and increasing smoothing, more influence is avoided and a smooth image can be achieved. However, when the S/N of an input image is low, or the like, the image-area separation determining unit (the image area separation 21) does not function properly, and erroneous determination of attribute such as determining as text on a halftone dot can occur. In such a case, if the process is greatly switched according to the attribute, deterioration in the image quality occurs. Therefore, in the configuration shown in FIG. 5, a function of switching use of a separation result in the filtering process according to the S/N is added.

FIG. 6 is an explanatory diagram of a use method of separation results in the filtering process. Whether to use a separation result in the filtering process is determined according to an S/N. In a case of No. 1 in FIG. 6, because the S/N thereof is in a region in which the image area separation functions well, a separation result is used both for the emphasis filter and the smoothing filter and the process is switched therein, and such image quality that a text portion is sharply expressed and a picture portion is smoothly expressed is achieved. In a case of No. 2, separation depending on an original, when the S/N is one that slightly lowers the precision of the image area, control in which the process is switched only for the smoothing filter, and the process is not switched for the emphasis filter is performed. This is because switching of process by the emphasis filter causes deterioration in the image quality likely to be noticeable in the final image quality when text determination is erroneously included in a picture portion. Moreover, if a portion with erroneous determination is emphasized, the portion with erroneous determination becomes easy to be detected in the edge amount detection performed later, it is also to avoid this. In a case of No. 3, because credibility of a determination result in the image area separation is low, the process is not switched at the time of filtering.

According to the above embodiment using a result of image-area separation process in the filtering process, even when the S/N ratio has changed with time degradation of a light source, by performing the image quality correction according to the S/N ratio, the image quality can be maintained. Furthermore, if filtering control is performed as shown in FIG. 6, image quality improvement and image quality maintenance can be controlled separately according to an input image.

More specifically, when an input image has a high S/N ratio, because it is expected that erroneous determination is less likely to occur in the image area separation, a result of image area separation is used and an emphasis filter suitable for each attribute is used. Therefore, the image quality can be improved. When the S/N ratio is low, a result of image area separation is not used. Because there is no deterioration in the image quality due to erroneous determination, the image quality can be maintained. As for a threshold to be a criterion to determine whether to use a result of determination, it is preferable that a threshold for the emphasis filter is higher than a threshold for the smoothing filter. Because the influence of erroneous determination causing deterioration in the image quality is greater than that of the smooth filter, by thus setting the thresholds, the image quality can be appropriately maintained.

When a result of image area separation is used in the filtering process, that is, in the case of the configuration shown in FIG. 5, the under-color removal process is controlled as shown in FIG. 7. FIG. 7 is a diagram for specifically explaining a control method of the under-color removal process according to an S/N ratio of an input image. A method for switching control of the under color removal in the second stage for a portion determined as text-achromatic according to the S/N of an input image is explained below.

In the under color removal explained in FIGS. 3A and 3B, the process performed when a separation result is text-achromatic is switched according to the S/N of an input image. When the input image has such an S/N that the image area separation functions in sufficient preciseness, as shown in FIG. 7(1), the CMY removal rate is set to a maximum value regardless of an edge amount.

When the function of the image area separation is not guaranteed, that is, in case of FIG. 7(2) and FIG. 7(3), a slop and a threshold for the S/N of the input image are set, and as for an S/N therebetween, a slope of a line and a threshold to acquire the CMY removal rate according to the S/N are set to small. It is preferable to set the threshold smaller as the S/N increases. When the S/N of the input image is high enough to make the image area separation function, it is set as shown in FIG. 7(3).

According to this under color removal in the second stage, if the S/N is high and the separation result is reliable, black text can be controlled to be expressed in a single color of K, and only when the S/N is low, the control of the portion determined as text can be changed. By switching a degree of single color of K of the black text according to the S/N of the input image, it is possible to control while switching between improvement in the image quality and maintenance of the image quality according to the input image.

However, in the method shown in FIG. 7, the under color removal amounts are calculated in excessively continuous values, and it is not low cost. Therefore, the under-color removal process in the second stage of a portion determined as text-achromatic explained referring to FIG. 7 is preferable to be performed by a method as shown in FIG. 8. With reference to FIG. 8, a second method for switching control of the under color removal in the second stage for a portion determined as text-achromatic is explained.

In the under color removal explained in FIGS. 4A and 4B, the process performed when a separation result is text-achromatic is switched according to the S/N of an input image. Specifically, the number of bits to be set as the CMY removal rate is varied according to the S/N.

In the case of an S/N (S/N≥A [dB]) of the input image enabling the image area separation function sufficiently precisely, there is no influence on the image quality even if the CMY removal rate is binary. That is, erroneous separation determination seldom occurs in a picture, even with binary CMY removal, deterioration in the image quality does not occur, and therefore, the CMY removal rate is in 1 bit (FIG. 8(1)).

In the case of an S/N (S/N≤B [dB]) of an input image with which the function of the image area separation is not guaranteed, because erroneous separation determination in a picture frequently occurs, it is necessary to prevent deterioration in the image quality due to drastic change of the process, by giving the CMY removal rates in fine steps. Therefore, the CMY removal rate is in several bits (4 bits in FIG. 8(3)).

In the case of an S/N between A [dB] and B [dB], it is preferable that the number of bits is larger than A [dB] and smaller than B [dB]. In the example shown in FIG. 8(2), it is 3 bits.

As described, by changing the number of bits of an under color removal rate according to an S/N of an input image, prevention of cost increase and suppression of deterioration in image quality can both be achieved.

According to one aspect of the present invention, image processing is possible that enables to suppress deterioration in image quality at low cost even when erroneous determination occurs in image area separation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for processing an image comprising:
   detecting and outputting an attribute of each pixel of input image data;
   performing a filtering process in which smoothing is performed on the input image data;
   detecting an edge amount being N value (where N>2) information from the input image data subjected to the smoothing;
   removing a chromatic color in a first removal amount according to the detected edge amount from all pixels;
   removing the chromatic color in a second removal amount according to the detected edge amount from a pixel that has been determined to have a text attribute and an achromatic attribute at the detecting the attribute; and
   determining a signal-to-noise (S/N) ratio of the input image data, wherein
   the second removal amount is determined based on a discrete M value (where M>2) corresponding to the edge amount,
   the filtering process includes smoothing with a different smoothing filter for each attribute of the pixel using a result of detection at the detecting the attribute when the determined S/N ratio exceeds a first threshold, and
   the filtering process includes emphasizing with a different emphasizing filter for each attribute of the pixel using the result of the detection at the detecting the attribute when the determined S/N ratio is equal to or higher than a second threshold.

2. The method for processing an image according to claim 1, wherein N>M.

3. The method for processing an image according to claim 1, wherein
   the M value varies according to the determined S/N ratio, and is set to become a large value when the determined S/N ratio becomes low, and to become a small value when the determined S/N ratio becomes high.

4. The method for processing an image according to claim 1, wherein the filtering process includes comparing the determined S/N ratio with the first threshold and the second threshold, and smoothing with the different smoothing filter for said each attribute of the pixel using the result of the detection at the detecting the attribute when the determined S/N ratio is between the first threshold and the second threshold.

5. An apparatus for processing an image, comprising:
   a pixel-attribute determiner configured to detect an attribute of each pixel of input image data;
   a filter configured to perform smoothing on the input image data;
   an edge-amount detector configured to detect an edge amount being N-value (where N>2) information from the input image data subjected to the smoothing; and
   an under-color remover configured to perform a first under-color removal process in which a chromatic color is removed in a first removal amount according to the detected edge amount from all pixels, and a second under-color removal process in which the chromatic color is removed in a second removal amount according to the detected edge amount from a pixel that has been determined to have a text attribute and an achromatic attribute by the pixel-attribute determiner, wherein
   the second removal amount is determined based on a discrete M value (where M>2) corresponding to the edge amount
   the filter is configured to perform smoothing with a different smoothing filter for each attribute of the pixel using a result of detection by the pixel-attribute determiner when a determined S/N ratio of the input image data exceeds a first threshold, and
   the filter is configured to perform emphasizing with a different emphasizing filter for each attribute of the pixel using the result of the detection by the pixel-attribute determiner when the determined S/N ratio of the input image data is equal to or higher than a second threshold.

6. The apparatus for processing an image according to claim 5, wherein the filter is configured to perform comparing the determined S/N ratio with the first threshold and the second threshold, and smoothing with the different smoothing filter for said each attribute of the pixel using the result of the detection by the pixel-attribute determiner when the determined S/N ratio is between the first threshold and the second threshold.

7. A computer program product for processing an image, comprising a non-transitory computer-readable medium storing a program that causes a computer to execute:
    detecting and outputting an attribute of each pixel of input image data;
    performing a filtering process in which smoothing is performed on the input image data;
    detecting an edge amount being N value (where N>2) information from the input image data subjected to the smoothing;
    removing a chromatic color in a first removal amount according to the detected edge amount from all pixels;
    removing the chromatic color in a second removal amount according to the detected edge amount from a pixel that has been determined to have a text attribute and an achromatic attribute at the detecting the attribute; and
    determining a signal-to-noise (S/N) ratio of the input image data, wherein
    the second removal amount is determined based on a discrete M value (where M>2) corresponding to the edge amount,
    the filtering process includes smoothing with a different smoothing filter for each attribute of the pixel using a result of detection at the detecting the attribute when the determined S/N ratio exceeds a first threshold, and
    the filtering process includes emphasizing with a different emphasizing filter for each attribute of the pixel using the result of the detection at the detecting the attribute when the determined S/N ratio is equal to or higher than a second threshold.

8. The computer program product for processing an image according to claim 7, wherein the filtering process includes comparing the determined S/N ratio with the first threshold and the second threshold, and smoothing with the different smoothing filter for said each attribute of the pixel using the result of the detection at the detecting the attribute when the determined S/N ratio is between the first threshold and the second threshold.

* * * * *